(12) United States Patent
Cortes et al.

(10) Patent No.: US 12,499,745 B1
(45) Date of Patent: Dec. 16, 2025

(54) POOL SURVEILLANCE SYSTEM WITH CAMERA INTEGRATION

(71) Applicants: Cesar Cortes, Coral Gables, FL (US); Jeremy Guillen, Coral Gables, FL (US)

(72) Inventors: Cesar Cortes, Coral Gables, FL (US); Jeremy Guillen, Coral Gables, FL (US)

( * ) Notice: Subject to any disclaimer, the term of this patent is extended or adjusted under 35 U.S.C. 154(b) by 111 days.

(21) Appl. No.: 18/392,133

(22) Filed: Dec. 21, 2023

(51) Int. Cl.
| | |
|---|---|
| *G08B 21/08* | (2006.01) |
| *G06V 10/82* | (2022.01) |
| *G06V 20/52* | (2022.01) |
| *G06V 40/10* | (2022.01) |
| *G06V 40/20* | (2022.01) |

(52) U.S. Cl.
CPC ............. *G08B 21/08* (2013.01); *G06V 10/82* (2022.01); *G06V 20/52* (2022.01); *G06V 40/10* (2022.01); *G06V 40/20* (2022.01)

(58) Field of Classification Search
CPC ........ G08B 21/08; G06V 20/52; G06V 40/10; G06V 10/82; G06V 40/20
USPC ....................................................... 340/573.6
See application file for complete search history.

(56) References Cited

U.S. PATENT DOCUMENTS

| | | | | |
|---|---|---|---|---|
| 5,886,630 | A * | 3/1999 | Menoud ............... | G08B 21/082 367/153 |
| 6,133,838 | A * | 10/2000 | Meniere ............... | G08B 21/082 340/573.6 |
| 7,839,291 | B1 * | 11/2010 | Richards .............. | G08B 21/082 340/553 |
| 9,388,595 | B2 | 7/2016 | Durvasula et al. | |
| 2004/0261167 | A1 * | 12/2004 | Panopoulos ............ | E04H 4/169 4/490 |
| 2015/0107015 | A1 * | 4/2015 | Ng ........................... | E04H 4/06 4/504 |
| 2016/0037138 | A1 * | 2/2016 | Udler ..................... | G06V 20/52 348/143 |
| 2020/0348583 | A1 * | 11/2020 | Rejniak ................. | G03B 15/03 |
| 2023/0222804 | A1 * | 7/2023 | Ren ....................... | G06V 10/454 382/103 |
| 2024/0046651 | A1 * | 2/2024 | Eames ................... | G06V 40/20 |

* cited by examiner

*Primary Examiner* — Kerri L McNally
(74) *Attorney, Agent, or Firm* — Sanchelima & Associates, P.A.; Jesus Sanchelima; Christian Sanchelima

(57) ABSTRACT

A swimming pool surveillance system with camera integration including a plurality of cameras fixed at predetermined locations in walls of the swimming pool, a panel assembly in communication with the plurality of cameras and a server in communication with the panel assembly through a network. The plurality of cameras capture images and video of the swimming pool. The panel assembly includes a panel processor and a panel memory which receive and process the image and video data from the plurality of cameras and transmit the processed data to the server. The server receives and analyzes the processed data from the panel assembly to determine physiologic information and positional information of a person to define a drowning event, in response to determining the drowning event, the server transmits an alert notification to external devices.

3 Claims, 4 Drawing Sheets

POOL SURVEILLANCE SYSTEM WITH CAMERA INTEGRATION

BACKGROUND OF THE INVENTION

1. Field of the Invention

The present invention relates to a pool surveillance system with camera integration and, more particularly, to a pool surveillance system with camera integration that includes cameras which coordinate with a processor to determine if an object exists within the pool.

2. Description of the Related Art

Several designs for surveillance systems have been designed in the past. None of them, however, include a camera housing having a plurality of seals to prevent water to flow therein, where the housing is recessed in the wall.

Applicant believes that a related reference corresponds to U.S. Pat. No. 5,886,630 issued for an alarm and monitoring device for the presumption of bodies in danger in a swimming pool. Applicant believes that another related reference corresponds to U.S. Pat. No. 9,388,595 issued for a pool cleaning system and method to automatically clean surfaces of a pool using imager from a camera. None of these references, however, teach of a pool surveillance system including a plurality of cameras in a pool capable of detecting movement and type of object, where the cameras are connected to a control panel to be powered and allow data transmission.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a pool surveillance system with camera integration that includes a control panel, the control panel including databases and network interfaces to transmit signals to computerized devices when an object is detected within the pool.

It is another object of this invention to provide a pool surveillance system with camera integration that includes infrared cameras to allow visualization of objects under low light conditions.

It is still another object of the present invention to provide a pool surveillance system with camera integration that includes cameras which can be used to stream live video or to detect objects through the use of AI image and pattern recognition.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
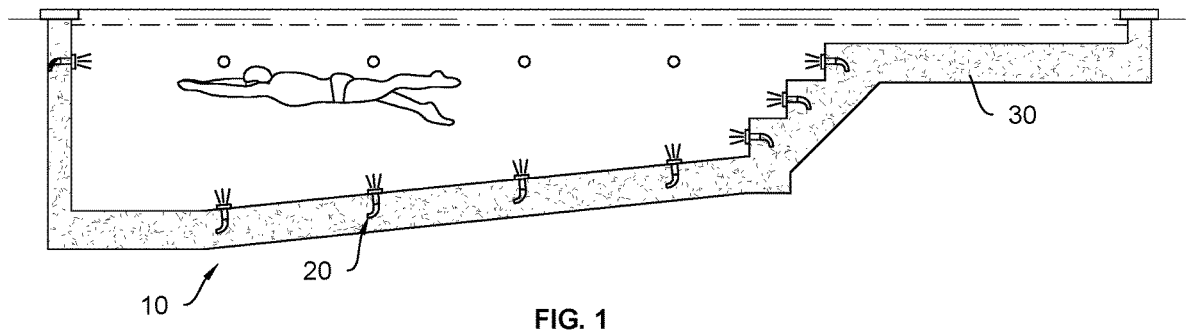
FIG. 1 depicts a cross sectional schematic view of the swimming pool incorporating the present invention 10.
Figure 1A:
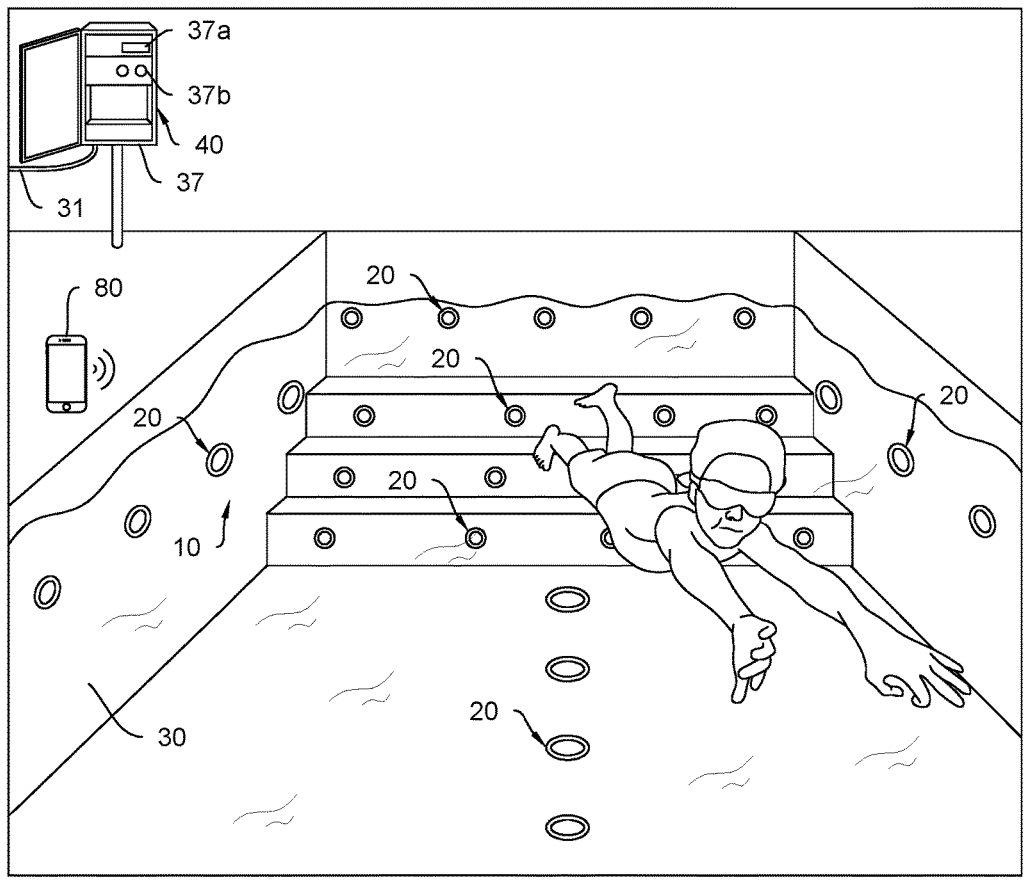
FIG. 1A represents an isometric operational view of the present invention 10 including a camera assembly 20 and a panel assembly 40.

Referring now to the drawings, where the present invention is generally referred to with numeral 10, it can be observed that it basically includes a camera assemblies 20 and a panel assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
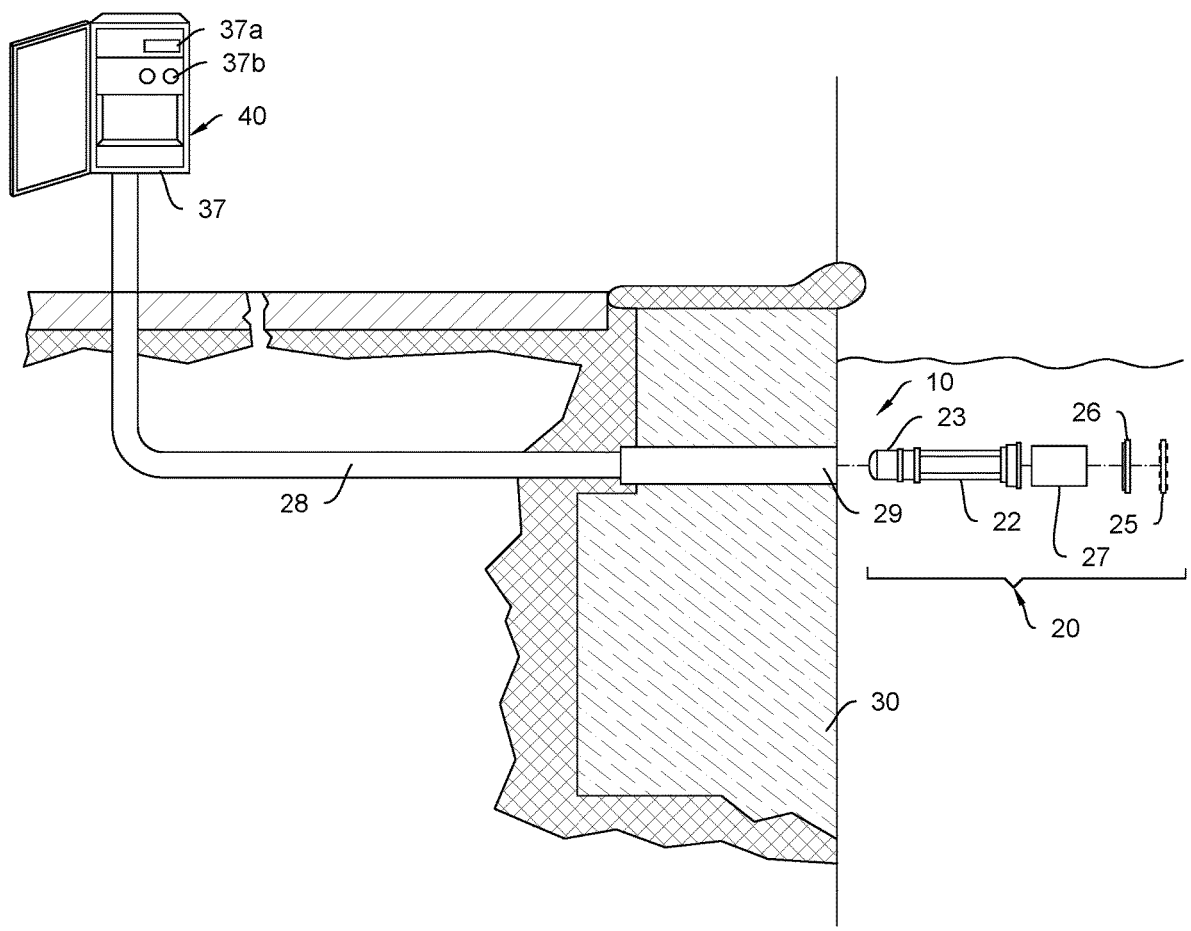
FIG. 2 shows an isometric view of the camera assembly 20, the camera assembly including hardwiring to be connected to the panel assembly 40.
Figure 3:
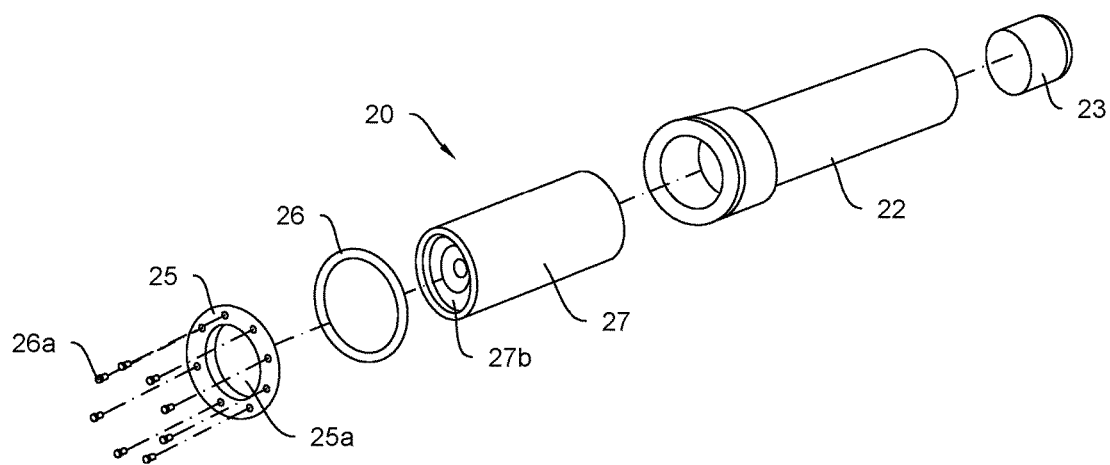
FIG. 3 illustrates an exploded view of camera assembly 20.
Figure 3A:
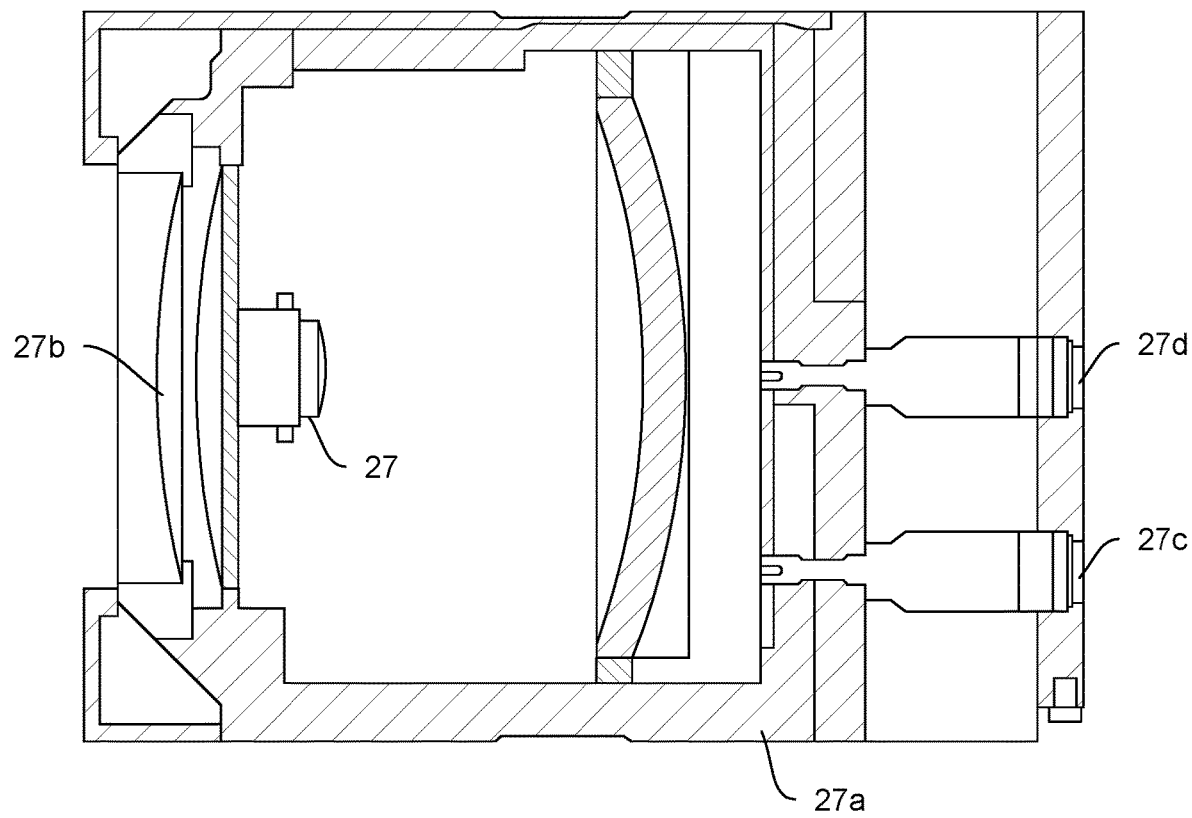
FIG. 3A depicts an enlarged cross-sectional view of a distal end of camera 27.
Figure 4:
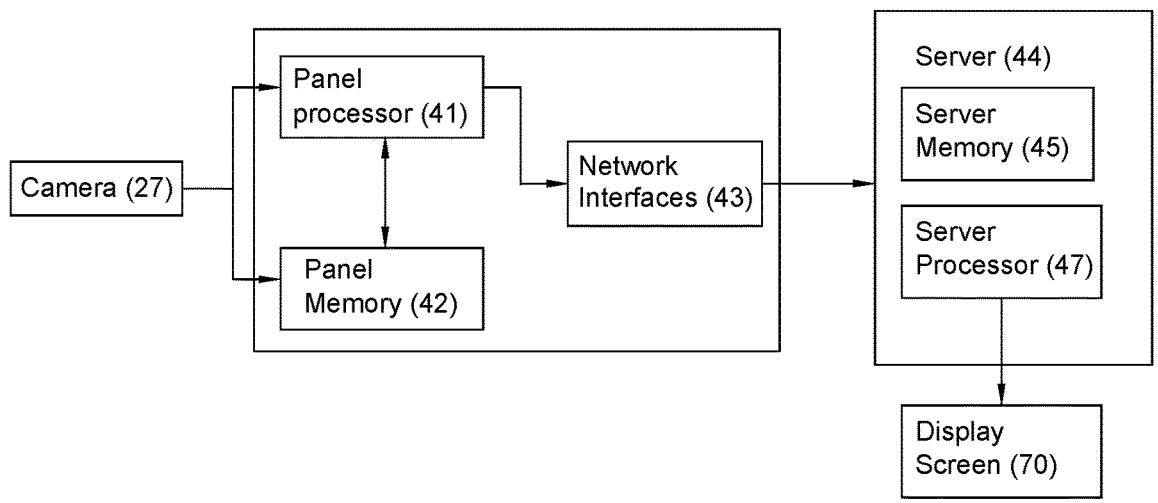
FIG. 4 depicts a schematic view of the connections between camera assembly 20 and panel assembly 40.

As best illustrated in FIG. 3, the camera assemblies 20 may include a camera 27, a cover 25, an enclosure 22, a sealing 23 and a sealing layer 26. As best illustrated in FIG. 1 camera assembly 20 may be fixed in different locations of swimming pool walls 30. The camera 27 may be introduced into swimming pool walls 30. It should be understood that swimming pool walls 30 may be adapted to have openings as the openings for lighting installations, as best shown in FIG. 2. The openings of the swimming pool walls 30 may be covered by a pipe 29. In a preferred embodiment the pipe 29 may be made of polyvinyl chloride. It also may be suitable for the pipe 29 to be made of polyethylene, stainless steel, copper, or any other suitable material.

The camera 27 may be electrically connected to the panel assembly 40 by means of electric and data cables. Electric and data cables 28 are covered by a plastic enclosure. In a preferred embodiment, electric and data cables 28 include standards capable of passing electric power along with data on twisted-pair Ethernet cabling. In a preferred embodiment, electric and data cables may include a cable ethernet FTP CAT 6A having a steady low voltage and data transfer over 328 ft. The camera 27 may have a waterproof housing 27a. The camera 27 may have a distal end and a proximal end. The camera 27 may have a wide angle lens 27b. The waterproof housing 27a may enclose a circumference of the wide angle lens 27b. It should be understood that the lens of camera 27 may be made of material and have a thickness which prevents corrosion of internal components of the camera 27. The camera 27 may include a CMOS sensor 27c capable of capturing images in low light conditions. The camera 27 may include an infrared sensor 27d capable of detecting elements in the pool. The camera 27 may be autofocus and include automatic white balance. The components of the camera 27 may form a solid cylindrical piece enclosed by the waterproof housing. Waterproof housing 27a of the camera 27 may be made of stainless steel, aluminum, or any other resistant material.

As best illustrated in FIG. 3, the camera 27 may be inserted into the enclosure 22. In a preferred embodiment the enclosure 22 may have a cylindrical shape. It also may be suitable for the enclosure 22 to have a rectangular shape, a triangular shape, or any other suitable shape. The enclosure 22 may have a bigger diameter than a diameter of the camera 27. The camera 27 may include a camera sensor inserted into the enclosure 22 having the external surface of the camera 27 in abutting contact with the internal walls of the enclosure 22. The camera sensor may preferably be a 23-megapixel camera having axis stabilization, and predictive autofocus. Furthermore, the camera 27 may include a camera memory related to processing activities, and camera processor (not shown in the drawings) for functionalities such as reset handler and always on, as encrypted bootloader and app. The enclosure 22 may have a greater length than a length of the camera 27. The enclosure 22 may include a second distal end and a second proximal end. The enclosure 22 may be hollow having an opening going through the distal end to the second proximal end thereof. The enclosure 22 may be sealed in a second proximal end by the sealing 23. Sealing 23 may include a power cord extending therefrom. The cover 25 may be fixed to the second distal end of the enclosure 22 by means of fasteners 26a. The cover 25 may include a plastic window 25a. The sealing layer 26 may be a rubber ring used to prevent water from going into the enclosure 22. The enclosure 22 may be introduced into openings of the swimming pool walls 30 and fixed therein as best illustrated in FIG. 1. Cameras 27 may be positioned equidistantly spaced pointing out to the pool as best shown in FIG. 1. Cameras 27 may be wired to the panel assembly 40.

The panel assembly 40 may include a housing 37, a processor 41, a power cord 31 and a memory 42. The processor 41 and memory 42 may be connected to a server 44 via network interfaces 43. The housing 37 may have a rectangular shape, a cylindrical shape, or any other suitable shape. The panel assembly 40 may be made of plastic, metal, or any other suitable material. In some embodiments the housing 37 may include a display 37a and buttons 37b. The display 37a may display settings for the present invention 10 including connection settings, and camera settings. The buttons 37b may be used to configure setting of the present invention 10. The panel assembly 40 may be connected to a power source through the power cord 31 to power the electronic components of the panel assembly 40 and the camera 27. The camera 27 may transmit data to the memory 42. The processor 41 may process the data acquired from the camera 27. Processed data may be transmitted to server 44. The server 44 may include a server memory 45 and a server processor 47. It should be understood that both server processor 47 and processor 41 include capacity for processing Advanced Video Encoding and High-Efficiency Video Coding, as well to provide Improved Video Frame Rates up to 100 Mbps bit rate. It also should be understood that the server memory 45 and a server processor 47 may have a graphics processing unit embedded therein.

The server memory 45 may include modules 50 and databases 60. The cameras 27 may be in communication with the server 44 through the communication network. The communication network 30 may include multiple embodiments such as, WLAN wireless local area network, wireless data communication such as LTE long term evolution, 5G, or 6G, a wired ethernet connection, or any other suitable communication network as known in the art. The server 44 may include a group of components to deploy a user interface in the display 37a and in mobile devices. The user interface 42 may take the form of a command line interface, a graphical user interface, a voice interface, or a web-based interface. It may be preferable for the memory 45 to be embodied as a hard drive, a network attached storage, or other type of machine-readable medium for the storage of electronic instructions. In one iteration of the present invention 10, databases 140 may be stored within the server memory 45 of the server 44.

Figure 5:
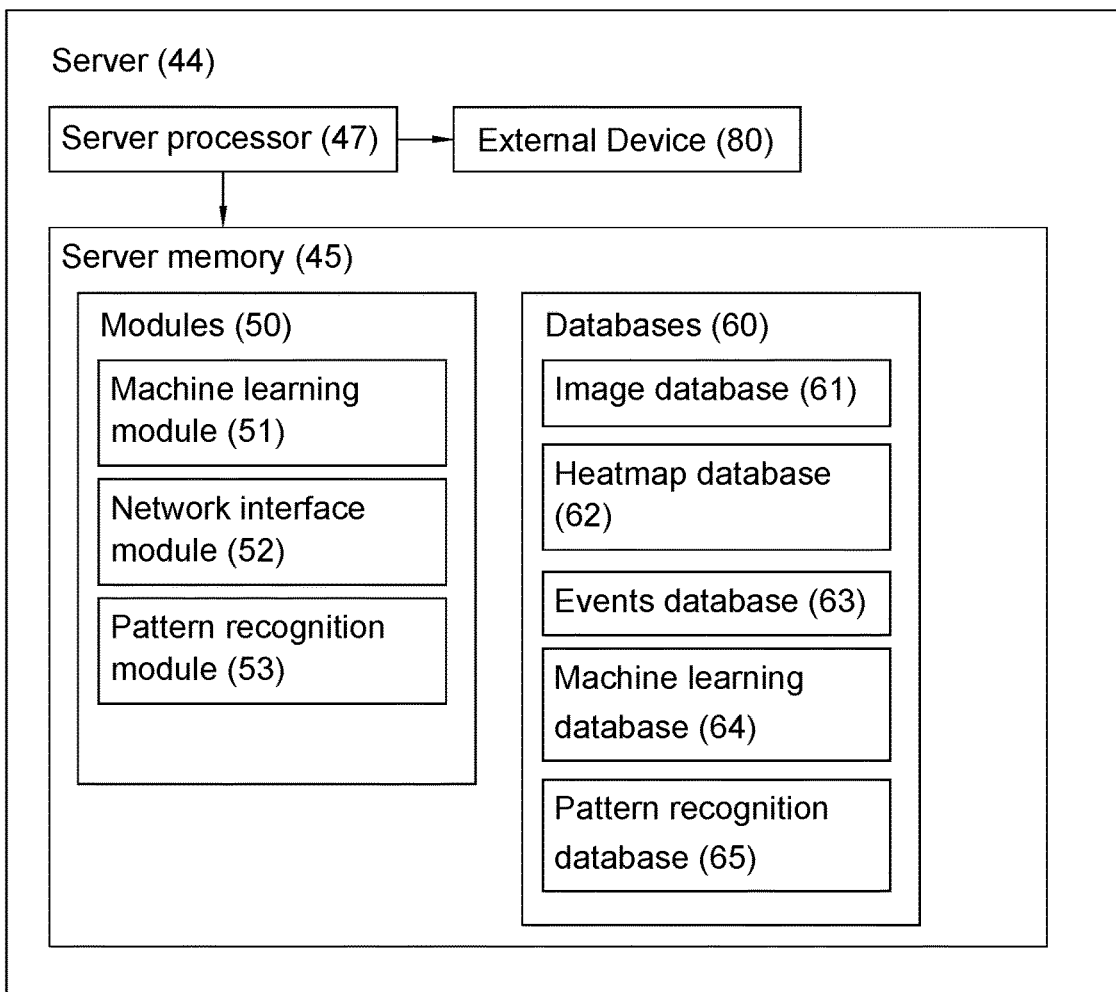
FIG. 5 is a schematic representation of an overview of the databases 50 and content modules 60.

As best seen in FIG. 5, set of modules 50 may include a machine learning module 51, a network interface module 52 and a pattern recognition module 53. The machine learning module 51 may acquire processed video data from panel assembly 40 and process it to identify objects in a pool. Module 51 includes algorithms to evolve and adapt from the video data is receives. The processed data coming from server processor 47 and originated by cameras 27 is classified. Cameras 27 may be disposed of inside walls, bottom and steps, these pool structures are generally referred to with numeral 30 as walls 30. Cameras 27 may be disposed in such a way in the walls 30 that when processed the data collected by cameras 27 may define a matrix including data for each of the spaces of the swimming pool. The machine learning module 51 may use neural networks to classify data. The pattern recognition module 53 may be used to process data from the machine learning module 51 to identify pattern shapes and pattern movements of objects within the pool. In a preferred embodiment the pattern recognition module 53 may distinguish objects, persons, and so on. The network interface module 52 may transmit data from the pattern recognition module to an external device, preferably a mobile device 80. The network interface module 52 may be hardwired or wireless using WiFI technologies, Bluetooth technologies, Zigbee technologies or any other communication technology.

In a preferred embodiment, the pattern recognition module 53 may be used to identify shape patterns and movement patterns of an object in a pool through data collected from a plurality of cameras 27 disposed in the walls 30 of the pool. Pattern recognition module 53 may identify if a person, animal or object is within the pool and identify by movement patterns if a person or animal corresponds to predetermined events, such as a drowning event. An output signal may be sent to an external device including but not limited to mobile devices or video data to displays 70. The drowning event, for example, may be defined as sensing abrupt movements of the person or animal followed by a lack of movement. Or the event could be that the vacuum roaming the bottom of the pool is stuck, or a person having dimensions smaller than a predetermined parameter is inside the pool, or any other event.

Databases 60 may include an image database 61, a heatmap database 62, an events database 63, a machine learning database 64, and a pattern recognition database 65. The image database 61 may store images and video from cameras 27, or other sources. In one embodiment the images and video stored are transmitted to be analyzed by modules 50. It also may be suitable to transmit the images and video of the cameras to the display 37a and/or to an external device 80. Heatmap database 62 may store data from the infrared sensor 27d which may be used by the pattern recognition module 53 and the machine learning module 51 to identify living organisms including human beings in the swimming pool. The events database 63 may store data of registered drowning events. The machine learning database 64 and the pattern recognition database 65 may include the algorithms used by the machine learning module 51 and the pattern recognition module 53, respectively.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A swimming pool surveillance system with camera integration, comprising:
 a plurality of cameras fixed at predetermined locations in walls of the swimming pool, the plurality of cameras being configured to capture images and video of the swimming pool, wherein said plurality of cameras include a waterproof housing enclosing a wide angle lens, wherein said plurality of cameras include sensors;
 a panel assembly in communication with the plurality of cameras, the panel assembly comprising a panel processor and a panel memory, wherein said panel memory stores instructions to display said images and said video from the plurality of cameras on a display embedded in said panel assembly, wherein said panel memory stores instructions that when executed by the processor cause the panel assembly to:
  receive image and video data from the plurality of cameras;
  process the image and video data; and
  transmit the processed data;
 a server in communication with the panel assembly by means of a network, the server comprising a server processor and a server memory, wherein the server memory stores instructions that when executed by the server processor cause the server to:
  receive the processed data from the panel assembly;
  analyze the processed data using machine learning algorithms to identify movement patterns and shape patterns in the swimming pool;
  determine physiologic information and positional information of a person to define a drowning event based on the identified shape patterns and movement patterns; and
  in response to determining said drowning event, transmit an alert notification to external devices.

2. The swimming pool surveillance system with camera integration set forth in claim 1, wherein said machine learning algorithms include networks algorithms trained to classify images and identify objects.

3. The swimming pool surveillance system with camera integration set forth in claim 1, wherein said server memory further stores instructions to transmit the images and video from the cameras to external devices in real-time.

* * * * *